May 31, 1927.   1,630,790
N. ESSICK
PLASTER MIXING DEVICE
Filed Sept. 21, 1925
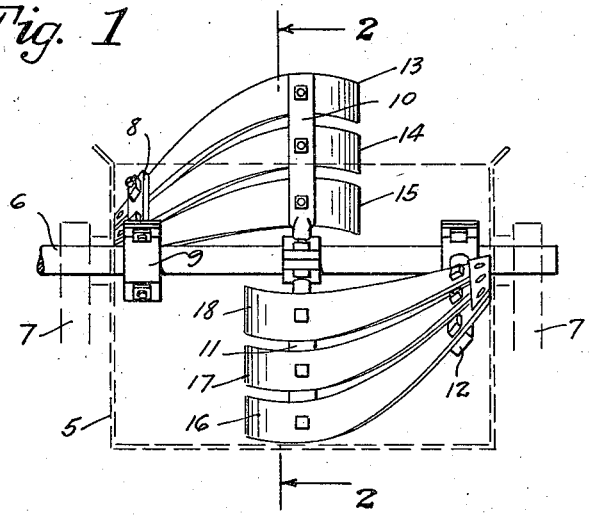
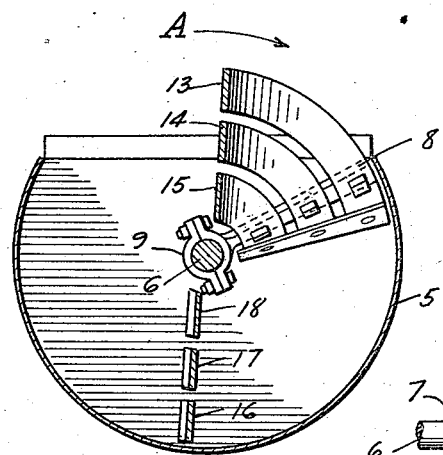
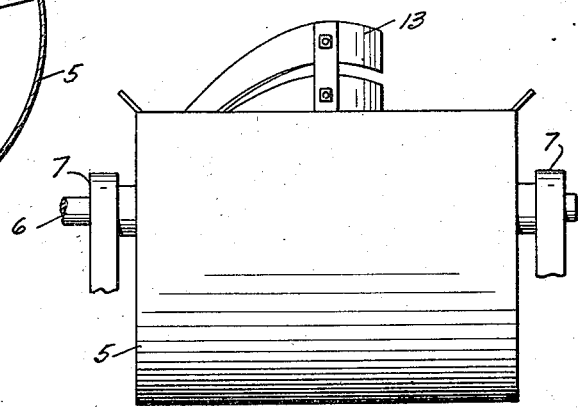
INVENTOR.
Newman Essick
BY Westall and Wallace
ATTORNEYS.

Patented May 31, 1927.

1,630,790

UNITED STATES PATENT OFFICE.

NEWMAN ESSICK, OF LOS ANGELES, CALIFORNIA.

PLASTER-MIXING DEVICE.

Application filed September 21, 1925. Serial No. 57,653.

This invention relates to a device adapted to mix plaster and like cementitious ingredients, and it is especially useful wherein the plastic material is of a viscous nature. Heretofore, mixers have been provided which are efficient with cementitious ingredients which are granular, but not equally so with viscous ingredients. The efficient mixing action for granular ingredients such as cement and concrete is that of shoveling or turning over the mix. Mortar, plaster, and like plastic material for efficient mixing requires cutting and hoeing of the batch or charge.

The primary object of the present invention is to provide a mixer wherein the entire batch or charge of material is hoed, cut, beaten, and whipped, during the mixing operation. In addition to the broader objects of this invention there are certain details of structure.

These objects together with other objects and corresponding accomplishments are obtained by means of the embodiment of my invention illustrated in the accompanying drawing, in which:

Fig. 1 is an elevation of a beater, its position as assembled with its drum being indicated in dotted lines; Fig. 2 is a section as seen on the line 2—2 of Fig. 1; and Fig. 3 is an elevation of the drum and mixer assembled.

Referring more particularly to the drawing, 5 indicates a drum open at the upper side in which the ingredients are mixed. Extending through the end head of the drum and journalled therein is the beater shaft 6. The drum and shaft are supported in bearing standards 7 which may be secured to a suitable base or frame, the drum being suspended on the shaft.

Secured to the beater shaft adjacent one of the heads is an arm 8. The arm may be secured to the shaft by a split collar 9, and the outer end thereof is turned through an angle. At the center of the shaft and secured thereto are diametrically opposed arms 10 and 11. Secured to the shaft and adjacent the other head is an arm 12 similar to arm 8 but diametrically opposed thereto. Arm 10 is disposed at an angle of 90° to arm 8, and arm 12 is disposed at 90° to arm 11. Secured to arms 8 and 10 are blades 13, 14, and 15. Blades 13, 14, and 15 extend longitudinally of the shaft, are spaced from one another and extend close to the peripheral wall of the drum. Each blade is bent so as to follow substantially a helical path around the shaft. The shaft is intended to turn the beater in the direction of the arrow A in Fig. 2. This would cause the ingredients to slide inwardly along the blade toward the intermediate portion of the drum. The inner ends of the blades are scooped slightly to impede the free inward movement of the material along the blades. Blades 16, 17, and 18 are secured to arms 11 and 12, being arranged to extend in the opposite direction to blades 13, 14, and 15, but otherwise are arranged in a like manner. The ends of the blades 16, 17, and 18 are scooped. The construction is such that blades 16, 17, and 18 tend to move the plastic material toward the intermediate portion of the drum.

It will be noted that in the revolution of the beater, the entire volume of the charge or batch within the drum is stirred and beaten. The plaster is not merely turned over and stirred, but it is cut by the relatively narrow blades and is moved longitudinally of the drum. There is a beating or whipping of the entire plastic batch, the blades passing close to the walls of the drum.

What I claim is:

1. In a plaster mixer, the combination of a cylindrical mixing chamber, a shaft journaled in said chamber, a beater element secured to said shaft and comprising helical blades secured to and extending along said shaft, said blades being closely spaced radially and lying in a common plane throughout their length, the blades being scooped at one end.

2. In a plaster mixer, the combination of a cylindrical mixing chamber, a shaft journaled in said chamber, a beater element secured at one end of said shaft and comprising radially extending rods spaced along said shaft and arranged at varying angles and helical blades extending between said rods, said blades being closely spaced along said rods whereby they will sweep substantially the entire radius of that end of the chamber and a second beater element having its blades helixed reversely to the blades of the first beater element, said second beater element being adapted to sweep substantially the entire radius of the remainder of the chamber, the adjacent ends of the blades of the respective elements being scooped.

3. In a plaster mixer, the combination of a cylindrical mixing chamber, a shaft journaled in said chamber, a beater element comprising spiral blades secured to said shaft, a second beater element comprising blades spiraled reversely to the blades of the first-named beater element, the adjacent ends of the blades of the respective elements being scooped.

In witness that I claim the foregoing I have hereunto subscribed my name this 11th day of September, 1925.

NEWMAN ESSICK.